F. W. GOLBY & J. S. PATTERSON.
THEATRICAL DEVICE.
APPLICATION FILED MAY 4, 1912.

1,045,138.

Patented Nov. 26, 1912.
4 SHEETS—SHEET 2.

F. W. GOLBY & J. S. PATTERSON.
THEATRICAL DEVICE.
APPLICATION FILED MAY 4, 1912.
1,045,138.
Patented Nov. 26, 1912.
4 SHEETS—SHEET 3.
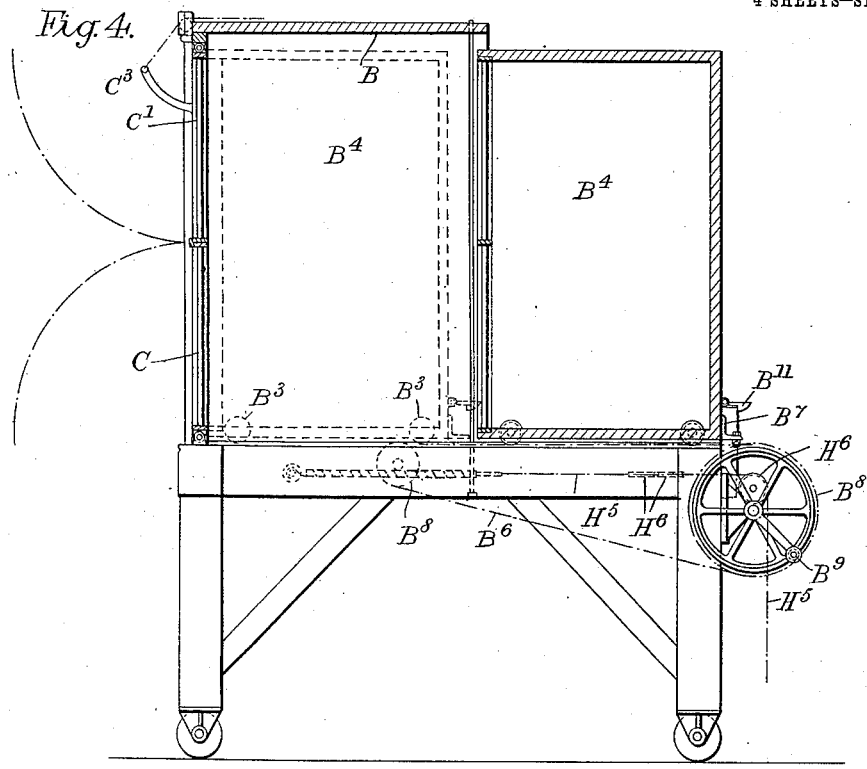
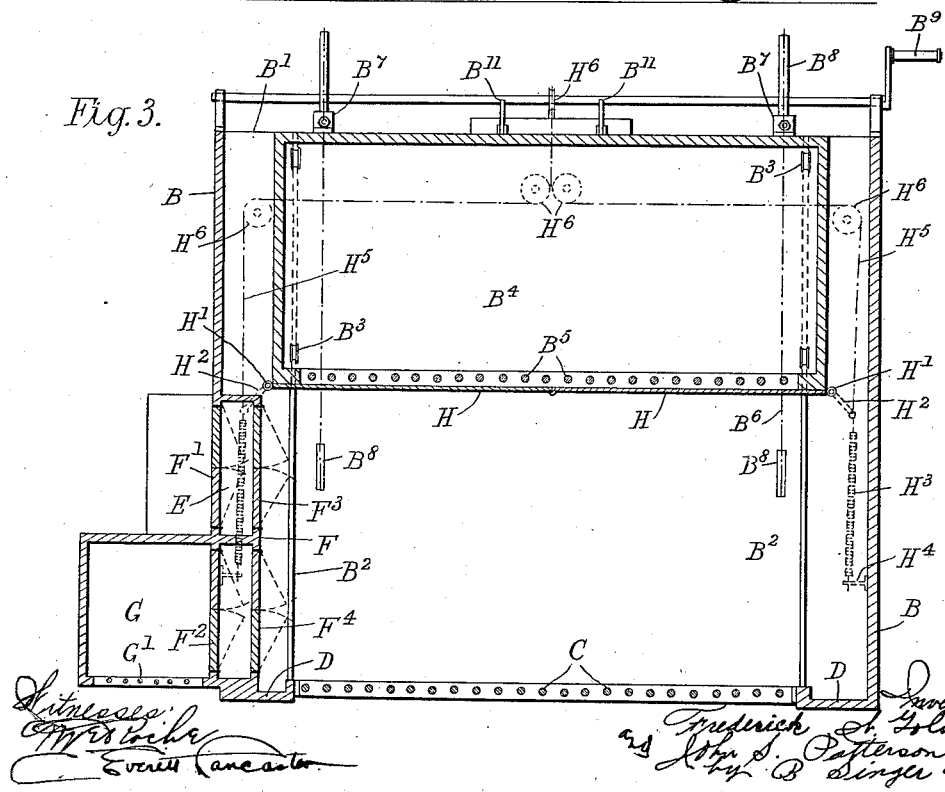

F. W. GOLBY & J. S. PATTERSON.
THEATRICAL DEVICE.
APPLICATION FILED MAY 4, 1912.

1,045,138.

Patented Nov. 26, 1912.

4 SHEETS—SHEET 4.

UNITED STATES PATENT OFFICE.

FREDERICK WILLIAM GOLBY AND JOHN SELIM PATTERSON, OF LONDON, ENGLAND, ASSIGNORS TO LALLA MARY PANTZER, PROFESSIONALLY KNOWN AS LALLA SELBINI, OF STREATHAM HILL, ENGLAND.

THEATRICAL DEVICE.

1,045,138.     Specification of Letters Patent.     Patented Nov. 26, 1912.

Application filed May 4, 1912. Serial No. 695,152.

*To all whom it may concern:*

Be it known that we, FREDERICK WILLIAM GOLBY, a subject of the King of Great Britain, residing at 36 Chancery Lane, in the county of London, England, patent agent, whose post-office address is 36 Chancery Lane, in the county of London, England, and JOHN SELIM PATTERSON, a subject of the King of Great Britain, residing at 105 Vauxhall Bridge road, in the county of London, England, theatrical carpenter, whose post-office address is 105 Vauxhall Bridge road, in the county of London, England, have invented certain new and useful Improvements in Theatrical Devices, of which the following is a specification.

This invention relates to theatrical devices of the kind described in the specification of the patent granted to Sigmund Newburger, professionally known as The Great Lafayette, and numbered 873,315, wherein a cage intended to contain a live lion, tiger, or other man-eating animal is used, said cage being so constructed and operated as to produce the effect of apparently feeding a person to the said live animal.

The object of the present invention is so to construct the apparatus as to render it impossible for the animal to have access to the actors at any time during the working of the illusion.

Figure 1:
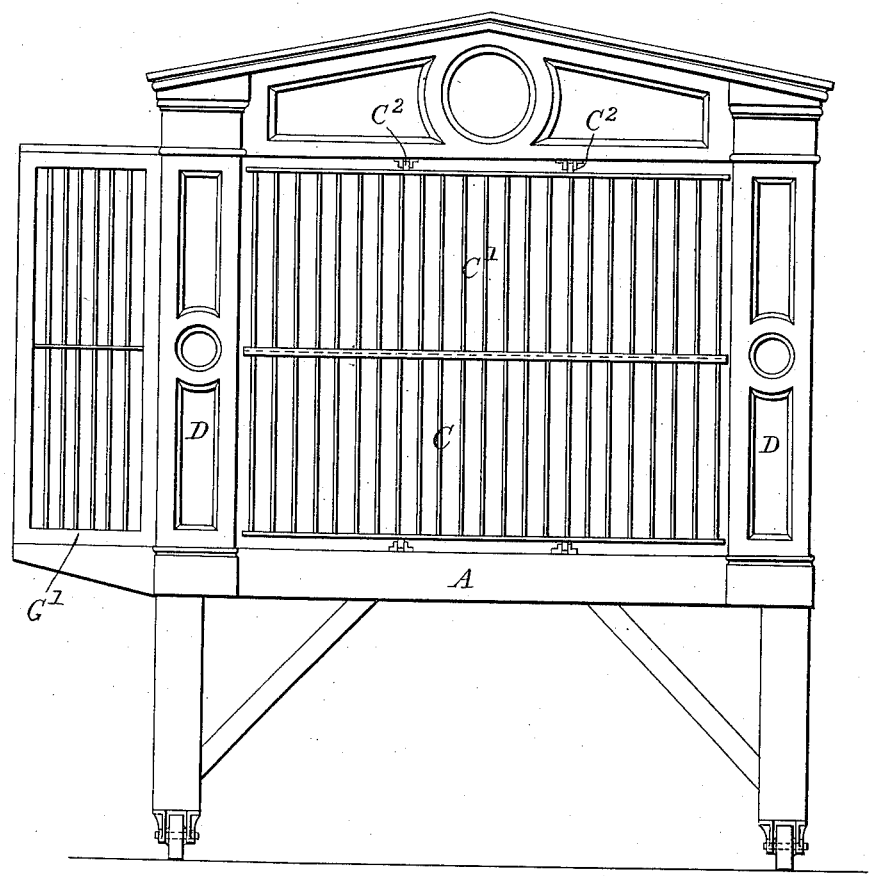
Figure 2:
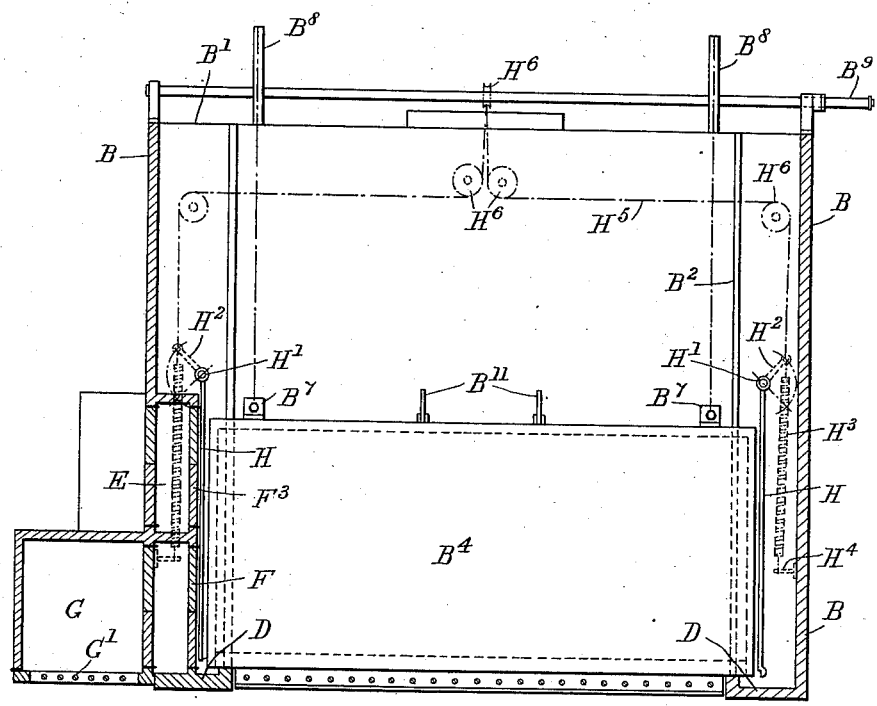
Figure 5:
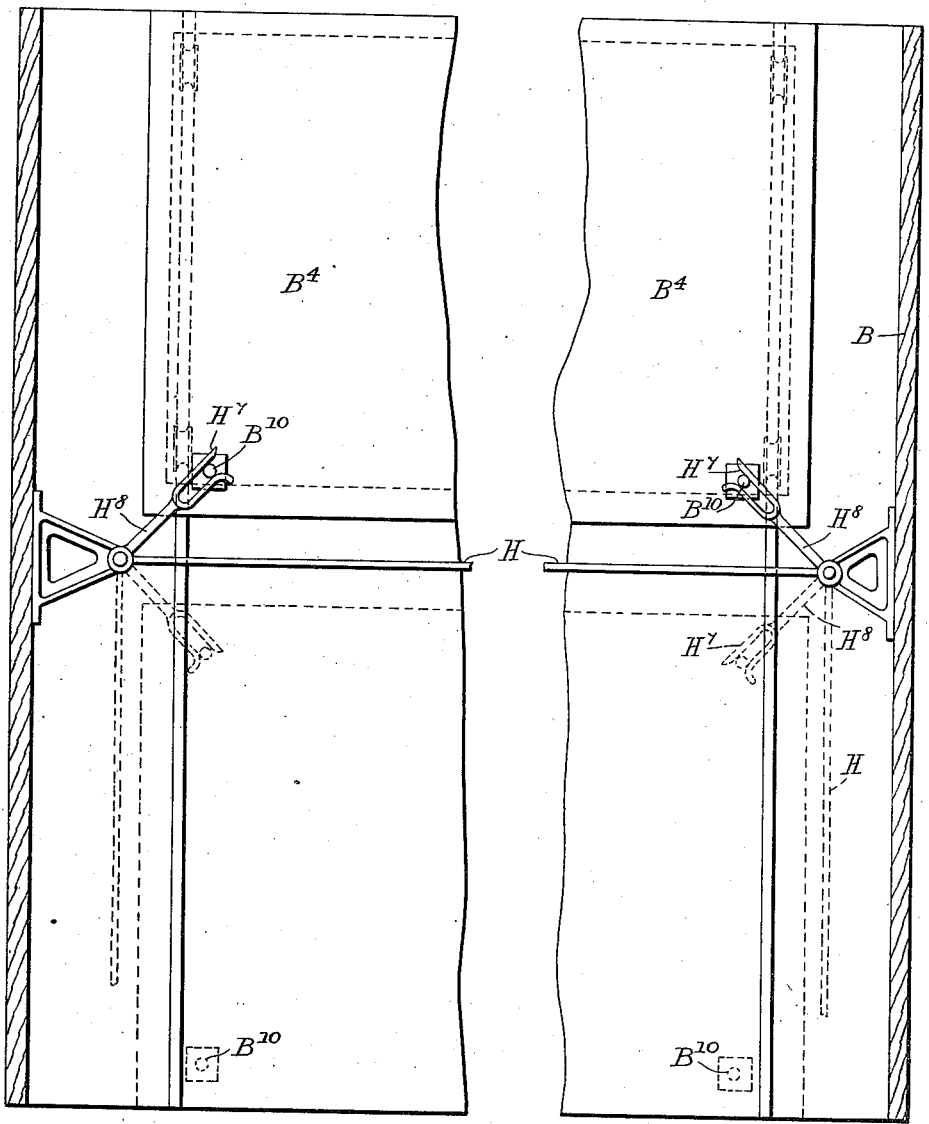
Figure 6:
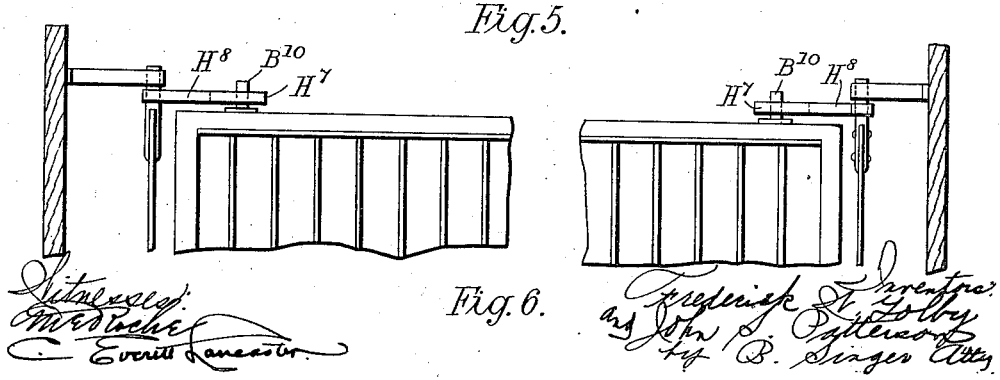

In the accompanying drawings Figure 1 is a front elevation of the improved cage and its connections; Fig. 2 is a sectional plan of same; Fig. 3 is a similar view showing the position of the parts when the movable cage is in the drawn back position; Fig. 4 is a sectional side elevation showing the two positions of the movable cage; and Figs. 5 and 6 are enlarged plan and elevation showing details of a modification.

The same letters of reference where they occur denote the same or corresponding parts in all the figures of the drawings.

In these drawings A is a wheeled stand and B is the cage which is mounted thereon so as to be readily transportable. The barred front of the cage is made in two parts, upper C' and lower C, both parts being hinged or pivoted at $C^2$. The upper part, C', is raised by a pull on a cable or other flexible connection secured to quadrant shaped arms $C^3$ fixed at each end of the upper part C'. The lower part C is held closed by the upper part C', and falls down when said upper part is raised. The dotted arcs in Fig. 4 show the travel of the two parts C and C' of the barred front of the cage.

The cage B is in the nature of a shell being entirely open at the rear, as shown at B' in Figs. 2 and 3, and the floor of the cage or shell B is provided with track rails $B^2$, extending from front to rear, which rails are engaged by the wheels $B^3$ mounted on the base of a second and closed cage $B^4$, in which the animal is confined, so that said second cage is adapted to be moved backward and forward in the outer cage or shell B. This second cage is provided with a fixed barred front $B^5$ the bars of which coincide in position with those of the two movable parts C and C' of the outer cage B.

The animal's cage $B^4$ can be moved backward and forward in the outer cage or shell B by cables passed over suitable pulleys; or, as shown in Figs. 2 to 4, by means of endless chains $B^6$ secured to brackets $B^7$ on the rear part of the cage $B^4$, and passing over chain wheels $B^8$ on parallel shafts mounted in bearings secured to the outer cage or shell B, and actuated by a winch handle $B^9$.

When the movable cage $B^4$ is in its rearmost position, as shown in Fig. 3, its barred front $B^5$ is covered by shutters or doors H rotatably mounted in the outer cage and actuated by suitable means. In the forms shown in Figs. 2 and 3 the shutters H are hinged or pivoted at H' in or to the outer shell B and are provided with fixed arms $H^2$ connected by helical or other suitable springs $H^3$ with arms or pins $H^4$ fixed to the outer shell B, so that the shutters H will be closed by the springs $H^3$ when the animal's cage $B^4$ is moved back to its rearmost position clear of the shutter hinges or pivots H'. This is the position shown in Fig. 3. To open the shutters again, a pull is given on a cable or other flexible connection $H^5$ which is passed over pulleys $H^6$, mounted on the floor of the shell B, and connected to the arms $H^2$.

In the modification shown in Figs. 5 and 6 the shutters are closed and opened automatically by the movable cage $B^4$. On each side of the roof of the cage $B^4$ and at its forward end is a fixed pin $B^{10}$, which when the cage B⁴ is near to the rearmost position, and whether traveling backward or forward, engages in the bifurcated end H⁷ of an arm H⁸ fixed to the contiguous shutter H and carries same to the closed or open position. The two positions of the cage B⁴ and of the shutter and the bifurcated arm H⁷, H⁸, are shown in Fig. 5.

Each side of the cage or shell B is provided with a pilaster D one of which covers a compartment E inclosed between the fixed partition F and the adjacent side wall of the cage or shell B. In this side wall and in the partition F are corresponding double or single doors F′, F², F³, and F⁴, opening communication between the outside of the cage, and the inside of a subsidiary cage G respectively, with the interior of the outer cage or shell B.

To simulate the feeding of a woman to a lion, the shutters H are opened and the movable animal's cage B⁴ is brought forward to the position shown in Fig. 2 when the animal can be seen by the audience through the two barred fronts C C′ and B⁵. The woman is then forced through the door G′ into the subsidiary cage G. The animal's cage B⁴ is then drawn back to the rearmost position and secured by the hooks B¹¹ engaging fixed blocks (not shown) and the shutters H are shut. This is the position shown in Fig. 3. The doors F³ and F⁴ in the partition F being then free to open into the blank space in the outer cage B, previously occupied by the movable cage B⁴, the woman is forced by an attendant through the doors F² and F⁴ into said space. Simultaneously an actor dressed in a lion's skin enters the said space through the doors F′ and F³ and pounces upon the woman. Thereupon the two parts C and C′ of the barred front of the outer cage or shell B are opened, and the actor throws off the lion's skin, and, with the woman, walks out of the opened front of the cage or shell B. The two parts C and C′ of the barred front of the cage B are then closed, the shutters H are opened and the movable cage with the animal therein is rapidly returned to the foremost position (shown in Fig. 2) in the outer cage or shell.

Having fully described our invention, what we claim and desire to secure by Letters Patent is:—

1. A theatrical device comprising an outer cage or shell, a rail track on the floor of said shell, a closed animal's cage located within said shell and provided with wheels to engage said rail track, and means for moving said animal's cage over said track, substantially as described.

2. A theatrical device comprising an outer cage or shell, a rail track on the floor of said shell, a closed animal's cage located within said shell and provided with wheels to engage said rail track, shutters pivotally mounted in said shell, means for opening and closing said shutters and means for moving said animal's cage over the track in said outer cage or shell, substantially as described.

3. A theatrical device comprising an outer cage or shell, a rail track on the floor of said shell, a closed animal's cage located within said shell and provided with wheels to engage said rail track, shutters pivotally mounted in said shell, springs secured to the shutters and to the outer shell so as to close said shutters when the animal's cage is in the drawn back position, and means for moving said animal's cage over the track in said outer cage or shell, substantially as described.

4. A theatrical device comprising an outer cage or shell, a rail track on the floor of said shell, a closed animal's cage located within said shell and provided with wheels to engage said rail track, shutters pivotally mounted in said shell, stops on said movable cage, arms on the shutters with which said stops engage, and means for moving said animal's cage over the track in said outer cage or shell, substantially as described.

5. A theatrical device comprising an outer cage or shell, a rail track on the floor of said shell, a closed animal's cage located within said shell and provided with wheels to engage said rail track, means for moving said animal's cage over said track, a pilaster on each side of the outer cage or shell, a partition extending from the rear of one of the pilasters so as to form a compartment hidden from the view of the audience, doors in said partition and doors in the adjacent side of the outer cage or shell to allow the actors to enter the space in said outer cage or shell when the animal's cage is in the drawn back position, substantially as described.

In testimony whereof we have hereunto set our hands in presence of two subscribing witnesses this 23rd day of April 1912.

FREDERICK WILLIAM GOLBY.
JOHN SELIM PATTERSON.

Witnesses:
  H. D. JAMESON,
  C. P. LIDDON.

---

Copies of this patent may be obtained for five cents each, by addressing the "Commissioner of Patents, Washington, D. C."